April 10, 1928.
M. KEHOE
1,665,415
PARKING BRAKE ATTACHMENT FOR MOTOR VEHICLES
Filed May 19, 1927
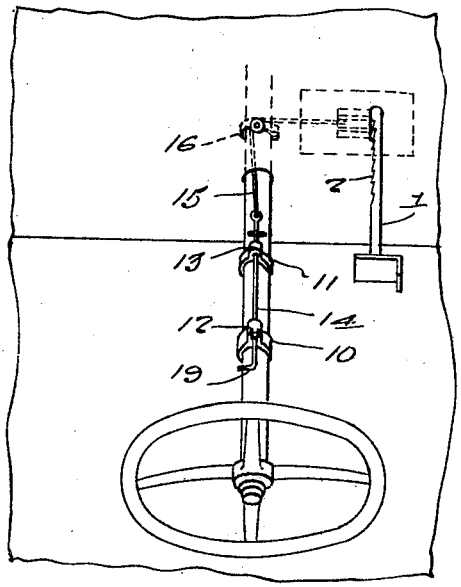
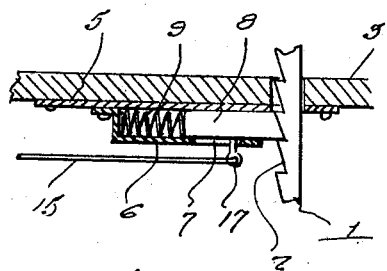
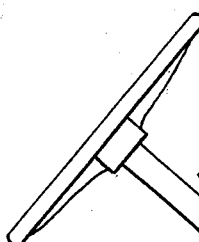
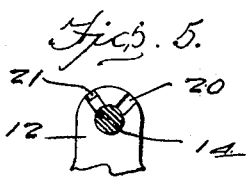
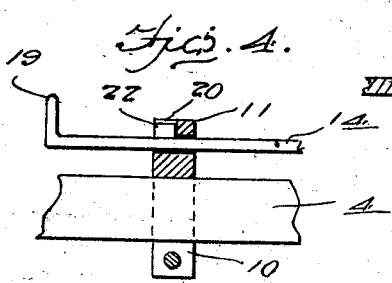
Inventor
Michael Kehoe
By Clarence A. O'Brien
Attorney Patented Apr. 10, 1928.

1,665,415

UNITED STATES PATENT OFFICE.

MICHAEL KEHOE, OF TUCSON, ARIZONA.

PARKING-BRAKE ATTACHMENT FOR MOTOR VEHICLES.

Application filed May 19, 1927. Serial No. 192,729.

The present invention relates to a parking brake attachment for motor vehicles and has for its principal object to provide a device which is adapted to be associated with the foot brake pedal whereby the latter may be locked in a brake applying position when the vehicle is parked, means being provided for permitting the foot brake to be used in the usual manner while the vehicle is in operation.

A further and important object of the present invention resides in the provision of a parking brake attachment of the above-mentioned character which may be readily and easily installed without necessitating any material alterations of the parts of the vehicle with which the same is to be associated, the same being further positive and efficient in its operation.

A still further object is to provide a device of the above mentioned character which is simple in construction, inexpensive, and furthermore adapted to the purposes for which the same is designed.

Other objects and advantages of this invention will become apparent during the course of the following description.

In the accompanying drawings forming part of this specification and in which like numerals are employed to designate like parts throughout the same:

Figure 1 is a top plan view of a foot brake pedal and the steering column of a motor vehicle showing my improved attachment associated therewith.

Figure 2 is a side elevation thereof.

Figure 3 is a detail showing the manner in which the slidable locking pawl engages the ratchet teeth formed in the side of the foot brake pedal.

Figure 4 is a detail view showing the locking means associated with the operating rod and one of the clamps, and Figure 5 is a top plan view of the uppermost clamp showing the notches formed therein and the manner in which the locking key carried by the rod cooperates with the notches.

In the drawing wherein for the purpose of illustration is shown the preferred embodiment of my invention, the numeral 1 designates generally the foot brake pedal of a motor vehicle, the same being formed with a series of ratchet teeth 2 in the inner side thereof. The floorboard of the motor vehicle through which this foot brake pedal extends is designated by the numeral 3 while the steering column is indicated at 4.

Secured to the bottom of the floorboard 3 is a plate 5 and this plate is formed with an opening which registers with the opening formed in the floorboard to accommodate the movable foot brake pedal 1 in the manner as is very clearly shown in Figure 3 of the drawing. A housing 6 is secured on this plate 5 and the end of the housing which is disposed adjacent the foot brake pedal 1 is open. The outer side of the housing is further formed with an elongated slot 7 the purpose of which will be presently described.

Slidable within the housing 6 is the pawl 8 the outer end thereof being beveled for cooperation with the ratchet teeth 2 formed in the side of the foot brake pedal 1 and an expansible coil spring 9 is arranged within the housing and is disposed between the closed end thereof and the adjacent end of the pawl for normally urging the same outwardly.

The present invention further comprehends the provision of a pair of clamps 10 and 11, respectively, the same being secured around the steering column 4 in any appropriate manner and these clamps are provided with the laterally projecting lugs 12 and 13 respectively, each of which is formed with a transverse bore through which is slidable the elongated operating rod 14. The lower end of the rod is provided with an eye to which is connected one end of a flexible cable 15. This cable extends through the floorboard and is trained over a suitable pulley 16 and is secured at its opposite end to an eye member 17 which is carried by the spring pressed pawl 8 and which projects through the slot 7 formed in the outer side of the casing 6. In this manner, an operative connection is provided between the sliding pawl 8 and the slidable operating rod 14.

A collar 18 is secured on the lower end portion of this rod 14 below the lower clamp 11 to provide a means for limiting the upward sliding movement of the rod 14 along the steering column 4 while the upper end of this rod is bent laterally to provide an actuating handle 19.

The lug 12 associated with the upper clamp 10 is formed with a pair of notches 20 and 21 respectively and these notches are of different lengths. Cooperating with these notches is a key 22 carried by the upper end portion of the rod 14 and manifestly when the key is disposed in the slot 20 which is of a greater length or depth than the slot 21, the pawl 8 will be disposed in the position shown in Figure 3 whereby the outer end thereof will be in engagement with the ratchet teeth of the foot brake pedal 1.

When the key 22 is disposed in the slot 21, and this is accomplished by pulling upwardly on the handle 19 to disengage the key from the slot 20 and then slightly rotating the rod until the key is disposed in alinement with the notch 21; the pawl 8 will be moved inwardly in the housing 6 against the tension of the coil spring 9 so that the outer end of the pawl will be held out of engagement with the ratchet teeth 2 formed in the foot brake pedal 1. In this manner, the pawl will be maintained in an inoperative position so that the foot brake may be used in the conventional manner when the automobile is in operation and there will be no possibility of the parking brake attachment interfering with the operation of the service brake.

However, when the vehicle is to be parked for any length of time, the key 22 is disengaged from the notch 21 and is moved into engagement with the notch 20 whereby the outer end of the pawl may be disposed for position for cooperation with the ratchet teeth 2 formed in the side of the brake pedal 1 and manifestly when the foot brake pedal is depressed, the pawl will cooperate with the ratchet teeth in holding the foot brake pedal in its depressed brake applying position thereby obviating the necessity of having to employ an emergency brake for locking the wheels against rotation while the car is parked.

The simplicity of my improved device enables the same to be readily and easily attached in proper position on a motor vehicle and may be operated from a remote point within easy access to the operator, thereby saving considerable time and labor in releasing the parking brake. Also, a device of this character will at all times be positive and efficient in carrying out the purposes for which it is designed.

While I have shown the preferred embodiment of my invention, it is to be understood that various changes in the size, shape and arrangement of parts may be resorted to without departing from the spirit or sacrificing any of the advantages of the appended claims.

What I claim is:

1. In combination, a foot brake pedal provided with a series of ratchet teeth, a spring pressed pawl slidably mounted on the under side of an automobile floor board and adapted for engagement with the ratchet teeth to hold the foot brake pedal in a brake applying position, means for releasing the pawl from a remote point, and additional means for locking the pawl in an inoperative position.

2. In combination with a foot brake pedal, provided with a series of ratchet teeth, a spring pressed pawl slidably mounted on the under side of the automobile floorboard and adapted for engagement with the ratchet teeth to hold the footbrake pedal in the brake applied position, means for releasing said pawl, said means comprising a pair of clamps secured around the steering column, lugs formed on the clamps, an operating rod slidable through the lugs, a flexible connection between the lower end of the operating rod and the slidable pawl, a handle on the upper end of the rod for actuating the same, and means for rocking the pawl in an inoperative position.

3. In combination with a foot brake pedal, provided with a series of ratchet teeth, a spring pressed pawl slidably mounted on the under side of the automobile floorboard and adapted for engagement with the ratchet teeth to hold the foot brake pedal in the brake applied position, means for releasing said pawl, said means comprising a pair of clamps secured around the steering column, lugs formed on the clamps, an operating rod slidable through the lugs, a flexible connection between the lower end of the operating rod and the slidable pawl, a handle on the upper end of the rod for actuating the same, and means for locking the pawl in an inoperative position, said last mentioned means comprising a key carried by the operating rod, the lug on one of said clamps being formed with a notch in which said key is normally disposed when the pawl is in engagement with the ratchet teeth, said lug being further formed with an additional notch for receiving the key on the rod to hold the operating rod in a raised position to maintain the pawl out of engagement with the ratchet teeth.

4. In combination with a foot brake pedal provided with a series of ratchet teeth, a housing secured on the under side of the automobile floorboard, a slidable pawl arranged in the housing, the outer end thereof projecting beyond one end of the housing for engagement with the ratchet teeth on the foot brake pedal, resilient means interposed between the inner end of the sliding pawl and the adjacent end of the housing for normally urging the pawl outwardly into an operative position, whereby the foot brake pedal may be maintained in a brake applying position when depressed, means for releasing the pawl from a remote point, and additional means for locking the pawl in an inoperative position.

In testimony whereof I affix my signature.

MICHAEL KEHOE.